US012617117B2

(12) United States Patent
Honold et al.

(10) Patent No.: US 12,617,117 B2
(45) Date of Patent: May 5, 2026

(54) CHAIN SAW AND METHOD FOR MAKING A CUT IN A WORK PIECE WITH A CHAIN SAW

(71) Applicant: Andreas Stihl AG & Co. KG, Waiblingen (DE)

(72) Inventors: Clemens Honold, Weinstadt (DE); Roland Mandel, Stuttgart (DE); Benedikt Posner, Spaichingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 59 days.

(21) Appl. No.: 18/805,052

(22) Filed: Aug. 14, 2024

(65) Prior Publication Data

US 2025/0058491 A1 Feb. 20, 2025

(30) Foreign Application Priority Data

Aug. 17, 2023 (EP) .................................... 23192021

(51) Int. Cl.
*B27B 17/02* (2006.01)

(52) U.S. Cl.
CPC .................................... *B27B 17/02* (2013.01)

(58) Field of Classification Search
CPC .............................. B27B 17/02; B27B 17/025
See application file for complete search history.

(56) References Cited

U.S. PATENT DOCUMENTS

| | | | | |
|---|---|---|---|---|
| 3,651,839 | A | 3/1972 | Stihl et al. | |
| 5,623,999 | A | 4/1997 | Linsbauer et al. | |
| 6,152,089 | A | 11/2000 | Neumann et al. | |
| 9,498,895 | B2 * | 11/2016 | Harer | B25F 5/021 |
| 10,130,043 | B1 | 11/2018 | McNamara | |
| D937,062 | S | 11/2021 | Mehra et al. | |
| 2011/0197458 | A1 * | 8/2011 | Karrar | B25F 5/021 83/522.16 |
| 2013/0319392 | A1 * | 12/2013 | Tholking | B28D 1/082 125/21 |
| 2024/0033872 | A1 * | 2/2024 | Brizzy | B23Q 13/00 |
| 2025/0026039 | A1 * | 1/2025 | Schlessmann | B27B 17/08 |

FOREIGN PATENT DOCUMENTS

| | | |
|---|---|---|
| CN | 217531122 U | 10/2022 |
| DE | 1 528 034 A1 | 9/1969 |
| DE | 94 11 866 U1 | 9/1994 |

(Continued)

*Primary Examiner* — Omar Flores Sanchez
(74) *Attorney, Agent, or Firm* — Walter Ottesen, P.A.

(57) ABSTRACT

A chain saw includes a housing, a guide bar, on which a saw chain is guided, and a drive motor for driving the saw chain. The chain saw has a transverse direction running perpendicular to a plane of the guide bar. The chain saw has a first and an opposing second longitudinal side. The saw chain spans a saw chain area when revolving around the guide bar, the saw chain area being delimited by an imaginary peripheral line in the direction of view in the transverse direction. The chain saw has at least one marking on its second longitudinal side, the marking being positioned on the housing such that the peripheral line, at the widest point of the guide bar in the direction of view in the transverse direction of the second longitudinal side, has a distance of no more than 2 cm to an elongation of the marking.

21 Claims, 6 Drawing Sheets

(56) References Cited

FOREIGN PATENT DOCUMENTS

| | | | |
|---|---|---|---|
| DE | 297 20 866 | U1 | 1/1998 |
| DE | 10 2010 008 102 | A1 | 8/2011 |
| DE | 10 2012 010 977 | A1 | 12/2013 |
| JP | 2002-36202 | A | 2/2002 |
| JP | 2019-209581 | A | 12/2019 |

* cited by examiner

CHAIN SAW AND METHOD FOR MAKING A CUT IN A WORK PIECE WITH A CHAIN SAW

CROSS-REFERENCE TO RELATED APPLICATIONS

This application claims priority of European patent application no. 23192021.6, filed Aug. 17, 2023, the entire content of which is incorporated herein by reference.

TECHNICAL FIELD

The disclosure relates to a chain saw and a method for making a cut in a work piece with a chain saw.

BACKGROUND

When working with chain saws, the felling of trees presents particular challenges to the operator. The orientation and depth of the cuts to be performed with the chain saw has a significant influence on whether the tree can fall in a controlled manner in the desired direction.

US 2011/0197458 discloses a display apparatus which generates a marking which indicates the drop direction of the tree when performing a base cut on the base.

SUMMARY

It is an object of the disclosure to create a chain saw which simplifies working with the chain saw, and to disclose a method for making a cut in a work piece with a chain saw.

This object is, for example, achieved by a chain saw having a housing, a guide bar, on which a saw chain is guided, with a drive motor, which is formed to drive the saw chain circumferentially during operation, the chain saw defining a transverse direction which runs perpendicular to a plane of the guide bar, the housing of the chain saw having a first longitudinal side and an opposing second longitudinal side, the longitudinal sides delimiting the housing of the chain saw in the transverse direction, the saw chain spanning a saw chain area when revolving around the guide bar, the saw chain area being delimited by an imaginary peripheral line in the direction of view in the transverse direction of the chain saw 1, whereby the chain saw has at least one marking on its second longitudinal side, the at least one marking being positioned on the housing in such a manner that the peripheral line, in the direction of view in the transverse direction of the second longitudinal side, has a minimum distance of no more than 2 cm or no distance to an imaginary straight line which runs along the marking.

In terms of the method, the object is, for example, achieved by a method for making a cut in a work piece with a chain saw, the chain saw having a housing, a guide bar, on which a saw chain is guided, and a drive motor, which is formed to drive the saw chain circumferentially during operation, the chain saw having a transverse direction which runs perpendicular to a plane of the guide bar, the housing of the chain saw having a first longitudinal side and an opposing second longitudinal side, the longitudinal sides delimiting the housing of the chain saw in the transverse direction, the saw chain spanning a saw chain area when revolving around the guide bar, the saw chain area being delimited by an imaginary peripheral line in the direction of view in the transverse direction of the chain saw, the chain saw having at least one marking on its second longitudinal side, the at least one marking being positioned on the housing in such a manner that the peripheral line, in the direction of view in the transverse direction of the second longitudinal side, has a minimum distance of no more than 2 cm or no distance to an imaginary straight line which runs along the marking, the saw chain being moved into the work piece until at least one imaginary straight line reaches a desired position of a base of a cut.

The chain saw has a first longitudinal side and an opposing second longitudinal side. It is provided that the chain saw has at least one marking on its second longitudinal side. The at least one marking is positioned on the housing in such a manner that the peripheral line, in the direction of view in the transverse direction of the second longitudinal side, has a minimum distance of no more than 2 cm or no distance to an imaginary straight line which runs along the marking.

The marking indicates to the operator the position of the saw chain on the top side and/or on the bottom side of the guide bar even if the saw chain cannot be seen by the operator, therefore, for example, is in the process of cutting. The marking indicates to the operator in particular the position of the tip of the tooth of the saw chain. The marking indicates the depth of cut when performing a cut. When felling a tree trunk, the operator must execute both the drop notch and the drop cut in the correct depth so that the felling hinge has the desired width. As a result of the marking, the operator can easily make the drop notch and/or drop cut in the desired depth. The making of window cut-outs when creating wooden houses is also simplified by the at least one marking.

In particular, the at least one marking is positioned on the housing in such a manner that the peripheral line, in the direction of view in the transverse direction of the second longitudinal side, has the minimum distance to the imaginary straight line or no distance to a region of the peripheral line on which the saw chain moves in the saw chain area in the direction of the housing.

If tree trunks lying on the ground in the woods are cut, this marking indicates the position of the saw chain in relation to the floor of the woods. As a result of this, a cut down to the floor of the woods, which can lead to a rapid blunting of the saw chain, can be avoided. As a result of this, working with the chain saw is facilitated for the operator. The operator locates the position of the saw chain in the cut via the at least one marking.

In particular, the at least one marking includes a first marking and a second marking. The two markings are in particular positioned on the housing in such a manner that the peripheral line, in the direction of view in the transverse direction of the second longitudinal side, has a first minimum distance of no more than 2 cm or no distance to an imaginary first straight line which runs along the first marking and has a second minimum distance of no more than 2 cm or no distance to an imaginary second straight line which runs along the second marking. In particular, the operator can locate the position of the saw chain in the cut via the first marking and the second marking.

The distance between the imaginary first straight line and the peripheral line in the direction of view in the transverse direction of the second longitudinal side is, in particular at the widest point of the guide bar, no more than 2 cm, in particular no more than 1 cm, in particular no more than 0.5 cm, wherein the distance can also be 0 cm. The distance between the imaginary second straight line and the peripheral line in the direction of view in the transverse direction of the second longitudinal side is, in particular at the widest point of the guide bar, no more than 2 cm, in particular no more than 1 cm, in particular no more than 0.5 cm, wherein the distance can also be 0 cm. The distance between the imaginary first straight line and the peripheral line and the distance between the imaginary straight line and the peripheral line are in particular measured on opposite sides of the guide bar.

The minimum distance between the imaginary straight line and the peripheral line on the respective assigned side of the guide bar is in particular as small as possible, particularly preferably zero.

In particular, a first marking and a second marking are provided on a longitudinal side of the chain saw. The markings are positioned on the housing in such a manner that the imaginary straight lines which run along the markings run in each case close to a peripheral line of the saw chain area.

In the direction of view in the transverse direction of the second longitudinal side, the peripheral line to an imaginary first straight line has a first minimum distance of no more than 2 cm, in particular no more than 1 cm, in particular no more than 0.5 cm, in particular no distance. In the direction of view in the transverse direction of the second longitudinal side, the peripheral line to an imaginary second straight line has a second minimum distance of no more than 2 cm, in particular no more than 1 cm, in particular no more than 0.5 cm, in particular no distance. The first and/or the second minimum distance can be 0 cm in an embodiment.

The at least one marking is in particular formed longitudinally, for example, as a line. In the direction of view in the transverse direction, the imaginary straight line runs in particular in the longitudinal direction of the marking and centrally through the marking. The marking is formed in particular by a straight line. If several markings are provided, in particular each marking is formed by a straight line. A different configuration of at least one, preferably all markings, for example by broken lines, undulating lines, lines arranged in rows, points or other graphical configurations, may also be advantageous. The at least one marking can in this case be contrasted by color and/or with respect to the contour of the housing in order to be clearly visible for the operator. It can be provided that at least one marking is formed by a mapped portion of a saw chain. The mapping can be emphasized in color and/or by an elevation and/or recess. A portion of a saw chain can also be mapped as a symbol next to a marking.

Alternatively or additionally, it is provided that the chain saw has on its second longitudinal side a first marking and a second marking, the two markings being positioned on the housing in such a manner that the two markings have a distance of at least 40 mm to one another at all points. The two markings spaced apart from one another make it possible to estimate the position of the guide bar even if at least one marking has a minimum distance of more than 2 cm to a straight line which runs along the marking. In particular, both markings have approximately the same distance to a straight line running in each case along the marking and/or are offset in the same direction with respect to the straight line. The direction of the offset and the size of the distance can in particular take into account a direction of view of the operator in at least one conventional use of the chain saw.

In particular, the distance between the markings is at least 45 mm, in particular at least 50 mm.

The distance between the markings is in particular at most 150 mm.

In order to enable a good estimation of the position of the cut generated with the saw chain via the total length of the guide bar, it is provided that at least one of the markings, preferably both markings, encloses an angle of less than 5°, in particular of less than 2°, in particular of less than 1° in the direction of view in the transverse direction with the longitudinal center axis of the guide bar. The longitudinal center axis runs in the longitudinal direction of the guide bar between the longitudinal sides and between the flat sides of the guide bar. The longitudinal center axis runs in a plane of the guide bar. In the context of manufacturing precision, at least one of the markings is particularly preferably oriented parallel to the longitudinal center axis of the guide bar.

The direction of view in the transverse direction can also be referred to as the direction of view of the longitudinal sides or as the direction of view of the side surfaces of a work apparatus, in particular of the longitudinal sides or side surfaces of a chain saw.

In particular, the first marking and the second marking enclose in the direction of view in the transverse direction an angle of less than 5°, in particular of less than 2°, in particular of less than 1°. In particular, the first marking and the second marking run parallel to one another in the direction of view in the transverse direction.

The guide bar runs in particular closer to the first longitudinal side than to the second longitudinal side of the chain saw. The second longitudinal side of the chain saw which has the two markings is in particular the longitudinal side of the chain saw which lies at a distance from the guide bar. When executing drop cuts, the chain saw is normally held so that the guide bar can be arranged close to the ground. The longitudinal side which lies adjacent to the guide bar points downward to the ground. The markings are arranged in particular on the opposite longitudinal side of the chain saw. The markings are arranged in particular on the longitudinal side of the chain saw which, when executing drop cuts or when executing cuts close to the ground, points upward. The markings are in particular arranged on the longitudinal side of the chain saw which, when executing drop cuts or cuts close to the ground, lies at a greater distance away from the ground.

In an alternative embodiment, the longitudinal side of the chain saw which marks the at least one marking is the longitudinal side of the chain saw which lies close to the guide bar. The at least one, in particular at least two markings are arranged in particular on the sprocket wheel cover. In particular, the chain saw has on each longitudinal side at least one marking, in particular on each longitudinal side at least two markings.

In particular, the chain saw has on the second longitudinal side a grid with openings. The openings and the grid struts of the grid lying between the openings span an intake region. In particular, the chain saw is driven by an internal combustion engine, and working air for the internal combustion engine is taken in via the intake region. In an alternative embodiment, the chain saw is driven by an electric motor. Particularly preferably, the chain saw is supplied with energy by a battery. It can be provided that cooling air for the drive motor, namely for the internal combustion engine or for the electric motor, is taken in via the intake region.

In particular, at least one of the markings runs at least partially in the intake region. In particular, it is provided that at least one of the markings runs at least partially on a grid strut of the grid. As a result of this, the marking can be particularly easily seen by the operator. An attractive exterior of the chain saw is simultaneously achieved. Alternatively, it can be provided that at least one marking runs at least partially, in particular entirely outside the intake region. This is in particular advantageous when the orientation of the grid struts of the grid and/or the position of the grid do not match or do not match with sufficient accuracy to the orientation of the longitudinal center axis of the guide bar and the position of the peripheral line of the saw chain area.

In particular, at least one marking is formed by a line highlighted in color. Such a marking can be easily applied. The line can be applied, for example, on the housing. In particular, the marking can be made at least partially in a color which forms a contrasting color to the surrounding color of the housing.

In a further alternative configuration, it can alternatively or additionally be provided that the first marking and/or the second marking are made from a different material to the housing. In this regard, for example, a two-component injection molding process can be provided to make the housing.

It is alternatively or additionally preferably provided that at least one marking is formed at least partially, in particular entirely by a protruding rib. As a result, the marking becomes more apparent. As a result of the configuration on a protruding rib, visibility is furthermore also ensured in the case of scratches or other damage to the chain saw. Alternatively, the marking can be formed at least partially, in particularly entirely by a recess. The rib and/or the recess are arranged in particular on the housing or on a component fixed on the housing.

In particular, the first marking and/or the second marking can be formed by an at least partially protruding rib. Alternatively, the first marking and/or the second marking can be formed by an at least partial recess. The ribs and/or the recesses are, in a further alternative configuration, arranged on the housing or on a component fixed on the housing.

In particular, the end face of the rib is additionally highlighted in color. In particular, the rib is formed so that color highlighting can be easily improved or renewed by an operator with a commercially available pen. Alternatively or additionally, it can be provided that at least one longitudinal side of the rib is highlighted in color. If both the end face of the rib and at least one longitudinal side of the rib are highlighted in color, the visibility is improved in particular in an oblique view of the rib so that the at least one marking is clearly visible even in inexpedient light conditions. If the marking is formed by a recess of the housing, color highlighting can additionally be provided. Due to the fact that the line highlighted in color is applied to a recess, damage to the marking by scratches on the housing or the like is largely prevented.

It can be provided that at least one marking is formed on a separate marking part fixed on the housing. As a result of the configuration of the marking on a separate marking part fixed on the housing, retrofitting of markings on existing chain saws is also possible. In particular, the marking part is retained detachably on the housing. As a result of the formation on the separate marking part, in the case of detachable fixing to the housing, a simple exchange of the marking part can be performed in the case of a damaged marking. The marking part is preferably a part which is not required for the stability of the housing and serves exclusively to indicate the depth of cut via the marking. The stability of the housing is in particular the rigidity and/or the strength of the housing. The separate marking part can be fastened to the housing, for example, via a latching connection, magnetic fixing or other type of fastening.

In particular, the chain saw bears, on the second longitudinal side, a further marking which is inclined by an angle of less than 10° with respect to the vertical direction of the chain saw. This further marking indicates the drop direction when executing a drop cut.

In particular, the chain saw bears, on the second longitudinal side, a further marking, a further imaginary straight line which runs along the further marking not having a distance of more than 10 mm to the longitudinal center axis of the guide bar at any point of the guide bar in the case of the direction of view in the transverse direction. This further marking preferably runs parallel to the longitudinal center axis. This further marking makes it possible to estimate the direction during penetration. The angle which this further marking encloses with the longitudinal center axis is in particular less than 5°, in particular less than 2°, in particular less than 1°.

It is provided for a method for making a cut in a work piece with a chain saw that the saw chain is moved into the work piece until the imaginary first straight line and/or the imaginary second straight line reaches the desired position of the base of the cut.

BRIEF DESCRIPTION OF DRAWINGS

The invention will now be described with reference to the drawings wherein.

DETAILED DESCRIPTION

Figure 1:
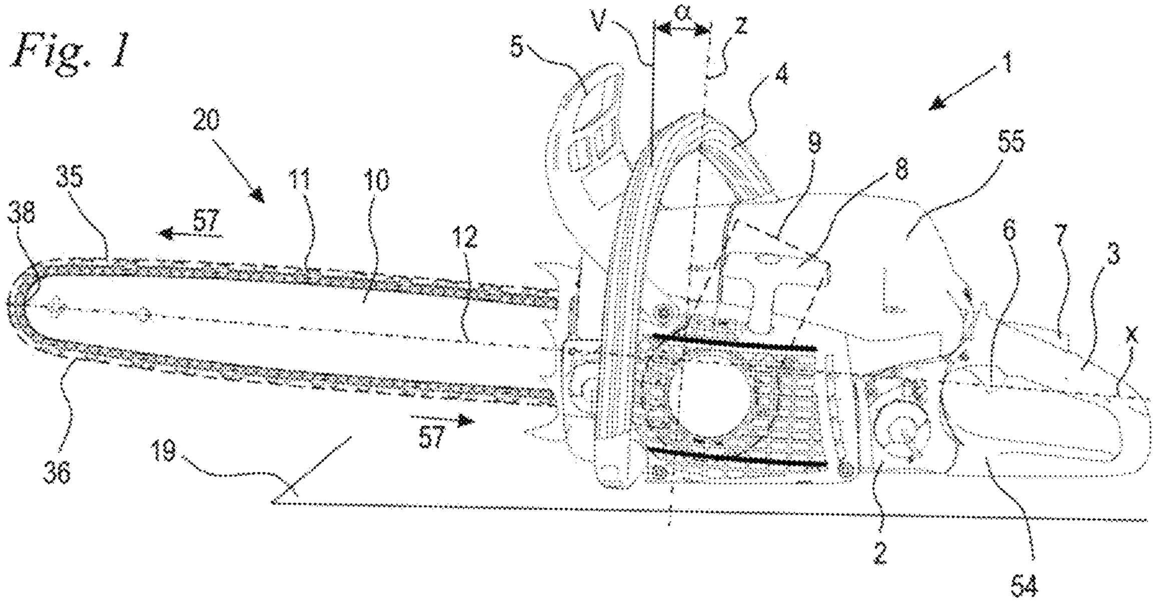
FIG. 1 and FIG. 2 show perspective representations of a first embodiment of a chain saw.

FIG. 1 shows a chain saw 1 in a perspective representation. The chain saw 1 is a handheld, hand-carried work apparatus. During operation, the chain saw 1 is carried and guided by the operator. The chain saw 1 is intended to be moved freely in the space by the operator so that the chain saw 1 can execute cuts in all spatial directions.

The chain saw 1 has a housing 2. The housing 2 is formed by several housing parts which are connected to one another in a fixed or relatively movable manner, for example, via anti-vibration elements. The housing 2 can be formed to be closed. It can, however, also be provided that the housing 2 is open partially to the surroundings in particular to permit relative movements of housing parts during operation. A drive motor 9 is arranged in the housing 2. Parts of the housing 2 can simultaneously form housing parts of the drive motor 9. Handles for guiding and carrying the chain saw 1 are arranged on the housing 2 during operation. In the embodiment, a rear handle 3 and a tubular handle 4 are arranged on the housing 2 of the chain saw 1. Operator controlled elements 6 and 7 are arranged on the rear handle 3. In the embodiment, the operating element 6 is a throttle, and the operator controlled element 7 is a throttle lock. In the embodiment, the drive motor 9 is an internal combustion engine. A starter handle 8 protrudes from the housing 2 to start the drive motor 9.

The chain saw 1 has a guide bar 10 on which a saw chain 11 is circumferentially arranged. The saw chain 11 is driven circumferentially around the guide bar 10 during operation of the drive motor 9. The saw chain 11 moves in a saw chain area 35 during operation. The saw chain area 35 corresponds approximately to the area which the saw chain 11 vacates during operation when cutting into a tree trunk. The saw chain 11 spans the saw chain area 35. In the direction of view perpendicular to a plane 37 (FIG. 4) of the guide bar 10, the saw chain area 35 is delimited on its outer circumference by an imaginary peripheral line 36 which is plotted with a dashed line in FIG. 1.

The guide bar 10 has a longitudinal center axis 12. The guide bar 10 is formed to be flat and normally has on its periphery a groove into which the saw chain 11 protrudes. In particular, driving links of the saw chain 11 protrude into the guide bar 10. The guide bar 10 has a free end 38 which is located at a distance from the housing 2 of the chain saw 1. The longitudinal center axis 12 extends centrally in the guide bar 10 and in the longitudinal direction of the guide bar 10. The guide bar 10 has longitudinal sides which are opposite one another, namely a top side 41 and a bottom side 42. The longitudinal center axis 12 extends centrally between the top side 41 and the bottom side 42 of the guide bar 10.

The saw chain 11 is driven in a running direction 57 during operation. At the top side 41 of the guide bar 10, the running direction 57 is directed away from the housing 2. At the bottom side 42 of the guide bar 10, the running direction 57 is directed toward the housing 2.

A hand guard 5 extends on the side of the tubular handle 4 facing the guide bar. The hand guard 5 can be formed to trigger a brake, not represented, for the saw chain 11.

The chain saw 1 has a longitudinal direction x. The longitudinal direction x runs parallel to the longitudinal center axis 12 of the guide bar 10. The longitudinal direction x can also be referred to as the guide bar direction. In the side view represented in FIG. 1, the longitudinal direction x of the chain saw 1 coincides with the longitudinal center axis 12 of the guide bar 10. The chain saw 1 has a vertical direction z which lies perpendicular to the longitudinal direction x. The chain saw 1 has a rest position 20. In the rest position 20, the chain saw 1 rests on a flat, horizontal rest surface 19. In the perspective representation in FIG. 1, the rest surface 19 is represented schematically. In the rest position 20, the tubular handle 4 engages over the housing 2 with a distance and the rear handle 3 points upward so that the chain saw 1 can be effectively gripped by an operator in the rest position 20. The vertical direction z encloses in the rest position 20 an angle α which is preferably less than 10° with a vertical V. In particular, the housing 2 includes a handle housing 54 and a motor housing 55 which are connected to one another via at least one anti-vibration element.

Figure 2:
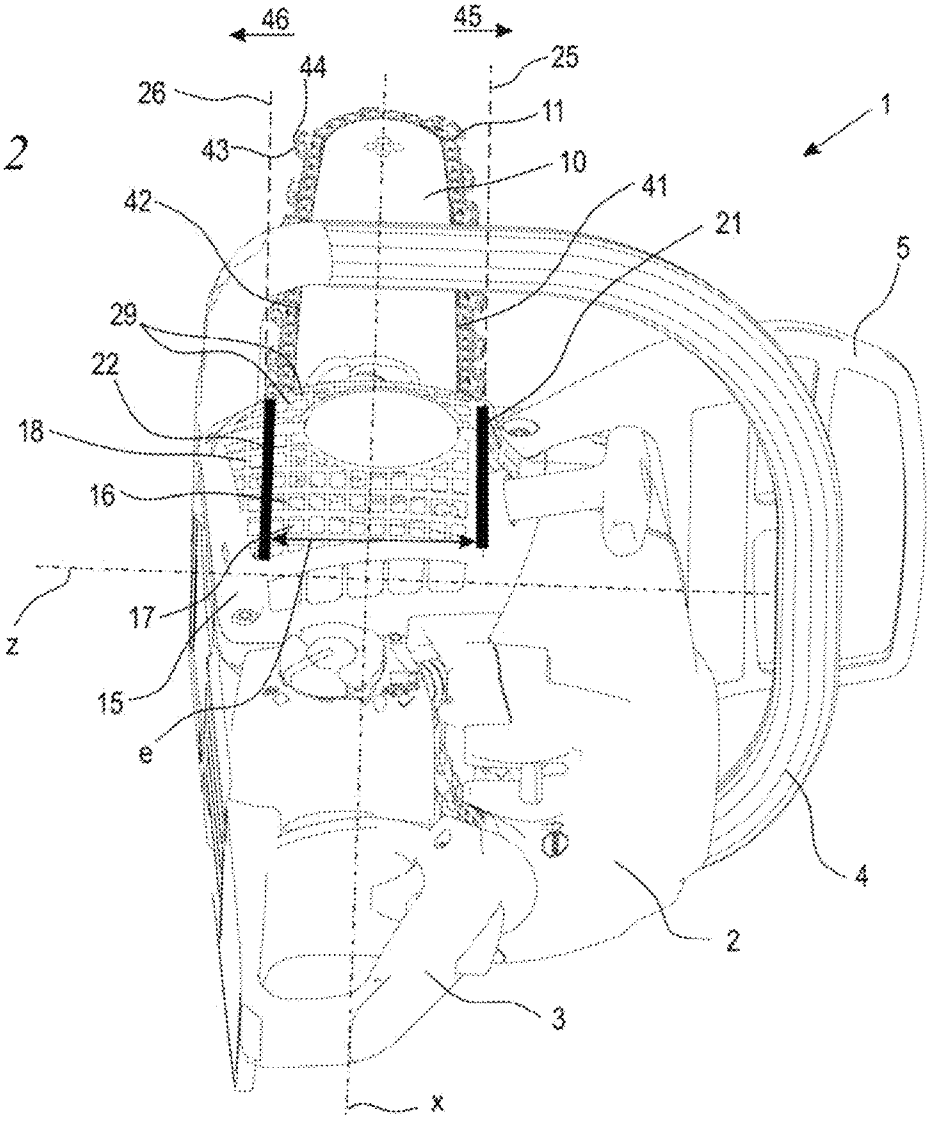

FIG. 2 shows the chain saw 1 in another orientation. The representation of the chain saw 1 in FIG. 2 corresponds approximately to the direction of view which an operator can have of the chain saw 1 when executing a drop cut. As FIG. 2 shows, the chain saw 1 has two longitudinal markings 21 and 22. The markings 21 and 22 are provided as longitudinal lines on the housing 2 and are highlighted in color from the housing 2 in the embodiment. As a result of this, the markings 21 and 22 are clearly apparent for an operator. An imaginary first straight line 25 runs adjacent to the top side 41 of the guide bar 10. The imaginary first straight line 25 runs along the first marking 21. An imaginary second straight line 26 runs adjacent to the bottom side 42 of the guide bar 10. The imaginary second straight line 26 runs along the second marking 22.

The markings 21 and 22 have a distance e to one another. The distance e is measured in particular in the direction of view in the transverse direction y of the chain saw 1. The distance e is in particular at all points of the markings 21 and 22 at least 40 mm, in particular at least 45 mm, in particular at least 50 mm. The distance e is in particular less than 150 mm.

In an alternative configuration, it can be provided that the chain saw 1 has only one of the markings 21 or 22, in particular only the second marking 22. The marking 21 or the marking 22 indicates in particular the depth of cut to the operator. If two markings 21 and 22 are provided, the position of the guide bar 10 is additionally indicated to the operator. This is advantageous, for example, when executing piercing cuts.

The saw chain 11 has cutting teeth 44 which have in each case a tip 43. The imaginary straight lines 25 and 26 run in particular at least at the widest point of the guide bar 10 approximately at the height of the tips 43 of the cutting teeth 44 of the saw chain 11. The imaginary straight lines 25 and 26 thus indicate the position of a cut which the chain saw 1 can generate. The imaginary first straight line 25 indicates the position of a cut in the case of cutting guides in the direction of the arrow 45. The imaginary second straight line 26 indicates the position of a cut in the case of a cutting guide in the direction of the arrow 46. The arrow 45 is directed from the bottom side 42 of the guide bar 10 to the top side 41 of the guide bar 10. The arrow 46 is directed from the top side 41 of the guide bar 10 to the bottom side 42 of the guide bar 10.

The housing 2 can have in particular a housing cover 15. If the drive motor 9 is an internal combustion engine, the housing cover 15 can be, for example, a fan cover, and cover the space in which a fan propeller of the drive motor 9 is arranged. The housing cover 15 can also be a different cover of the housing. In the embodiment according to FIG. 2, the housing cover 15 bears the two markings 21 and 22. The housing cover 15 has a grid 16, the grid struts 29 of which separate a plurality of openings 17 from one another. The grid struts 29 of the grid 16 and the openings 17 define an intake region 18. In the embodiment, the first marking 21 runs in particular at a short distance from the intake region 18 outside the intake region 18. The second marking 22 runs at least partially, in particular entirely, through the intake region 18.

Figure 3:
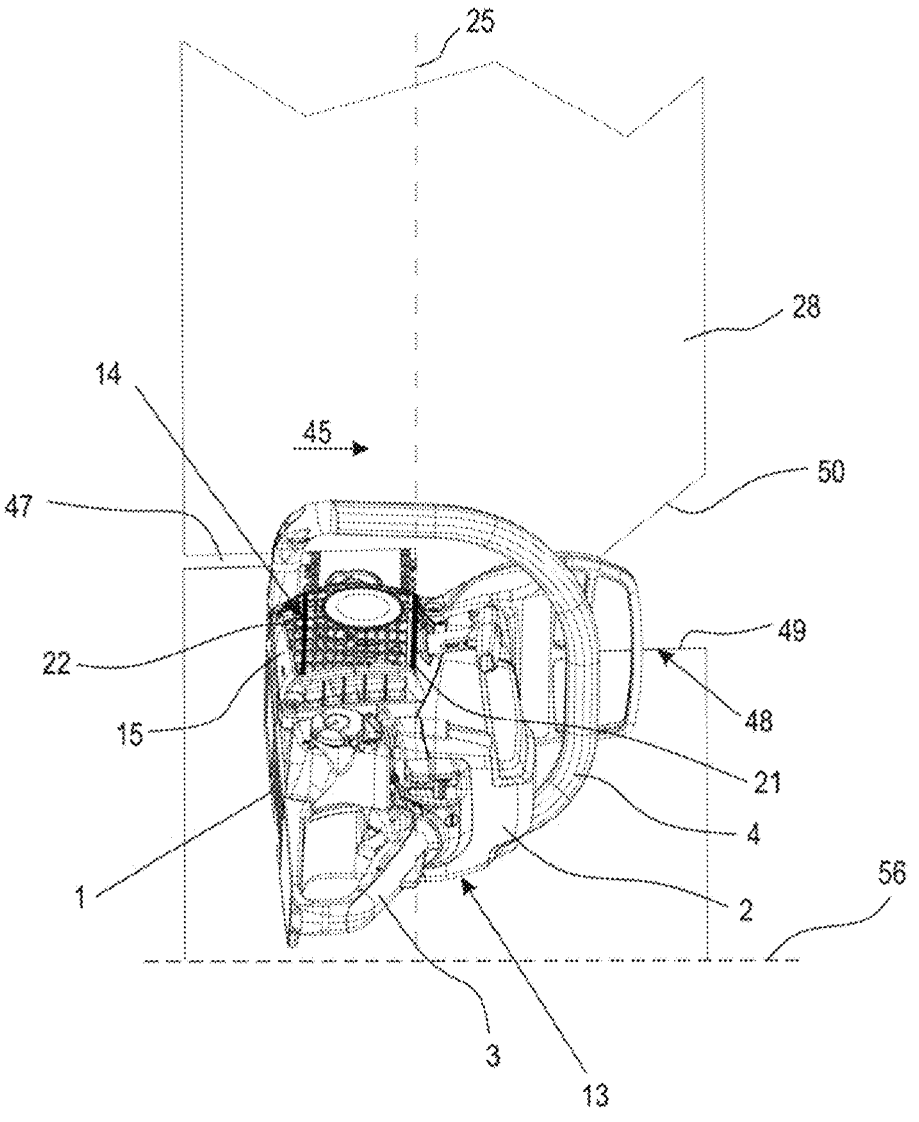
FIG. 3 shows a schematic representation of the making of a drop cut with the chain saw from FIGS. 1 and 2.

FIG. 3 schematically shows the arrangement of the chain saw 1 when executing a drop cut 47 in a tree trunk 28. A drop notch 48 has already been made on the opposite side of the tree trunk 28. The drop notch 48 includes a drop notch base 49 and a drop notch roof 50. When making drop notch base 49 and drop notch roof 50, the chain saw 1 is moved in the direction of the arrow 46 (FIG. 2). During production of the drop cut 47, the chain saw is moved in the direction of the arrow 45. The position of the drop notch chord, at which drop notch roof 50 and drop notch base 49 meet, is indicated to the operator during sawing of drop notch roof 50 and drop notch base 49 by the second marking 22. The drop notch chord is covered in FIG. 3 by the chain saw 1 and is therefore not visible. The imaginary first straight line 25 of the first marking 21 is plotted in FIG. 3, which imaginary first straight line 25 indicates to the operator how deep the drop cut 47 has already been made. As a result of this, an operator can estimate in a simple manner whether the hinge already has the desired width. The desired width corresponds in particular to the desired depth of cut.

As FIG. 3 shows, the chain saw 1 has a first longitudinal side 13 which is oriented downward in the case of the position represented in FIG. 3. The chain saw 1 has an opposite second longitudinal side 14 which points upward in the case of the orientation of the chain saw 1 represented in FIG. 3. A possible position of the base 56 is schematically plotted in FIG. 3 with a dashed line. The second longitudinal side 14 is the longitudinal side of the chain saw 1 at a distance from the base 56.

Figure 4:
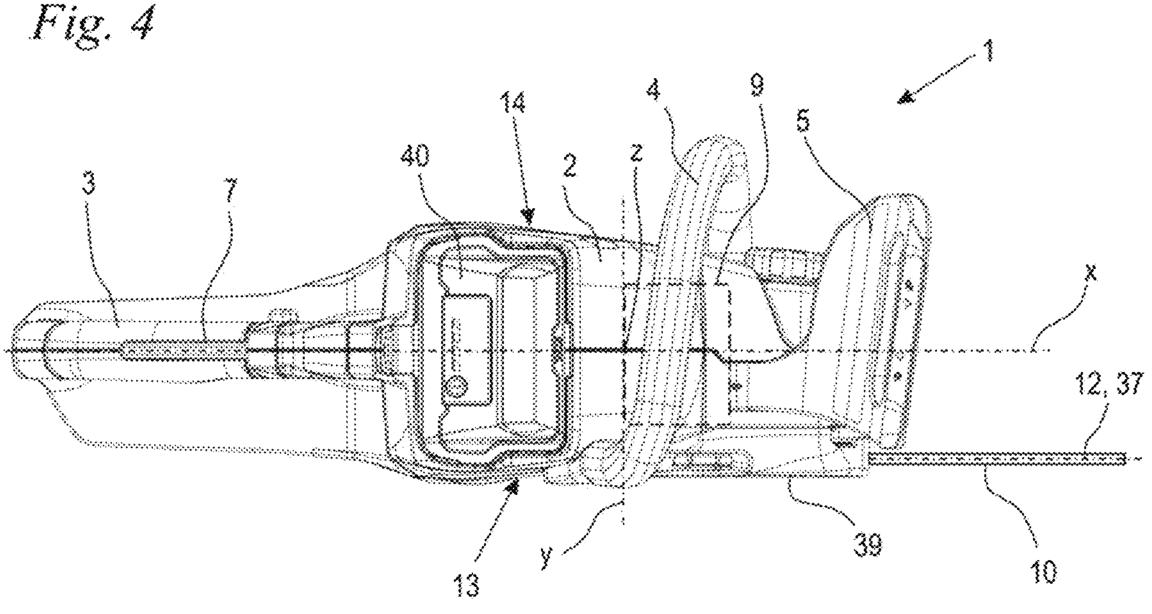
FIG. 4 shows a plan view of a further embodiment of a chain saw.

The position of the longitudinal sides 13 and 14 is explained in FIG. 4 on the basis of a further embodiment of a chain saw 1. The chain saw 1 represented in FIG. 4 is driven by a drive motor 9 which is formed as an electric motor. The markings 21 and 22 are not visible in the plan view in FIG. 4. A battery 40 serves to supply the drive motor 9 with energy. The battery 40 is held in particular in the housing 2. The guide bar 10 represented schematically in FIG. 4 is arranged adjacent to the first longitudinal side 13 of the chain saw 1. The chain saw 1 has a transverse direction y. The transverse direction y lies perpendicular to the longitudinal direction x and perpendicular to the vertical direction z. The position perpendicular to a direction refers to the position orthogonal to a direction. The transverse direction y runs parallel to the axis of rotation of an output shaft of the drive motor 9. The transverse direction y lies parallel to the drive axis of a drive pinion which drives the saw chain 11. This correspondingly also applies to the embodiment with an internal combustion engine.

In the case of the direction of view in the transverse direction y, the imaginary straight lines 25, 26 run in particular in the longitudinal direction of the markings 21 and 22 and centrally through the markings 21 and 22. The imaginary straight lines 25 and 26 run in particular in an elongation of the markings 21 and 22, in particular in the direction of the guide bar 10 and the saw chain 11.

The guide bar 10 is fixed on the housing 2. To this end, the guide bar 10 is held in a clamped manner in particular by a sprocket wheel cover 39. In the embodiment, a part of the first longitudinal side 13 is formed by the sprocket wheel cover 39. The first longitudinal side 13 is the region of the chain saw 1 which is visible in the direction of view parallel to the transverse direction y of the side of the chain saw 1 which lies adjacent to the guide bar 10. The opposite longitudinal side 14 is the region of the chain saw 1 which is likewise visible in the case of the direction of view in the opposite direction parallel to the transverse direction y. The longitudinal sides 13 and 14 delimit the chain saw 1 in the transverse direction y. The guide bar 10 has the plane 37 in which the guide bar 10 extends. The guide bar 10 is formed to be flat. In the plan view represented in FIG. 4, the plane 37 coincides with the longitudinal center axis 12 of the guide bar 10.

When executing the cuts 47, 49 and 50 represented in FIG. 3, the first longitudinal side 13 points downward and the second longitudinal side 14 points upward. The markings 21 and 22 are applied to the second longitudinal side 14 which is clearly visible for the operator.

Figure 5:
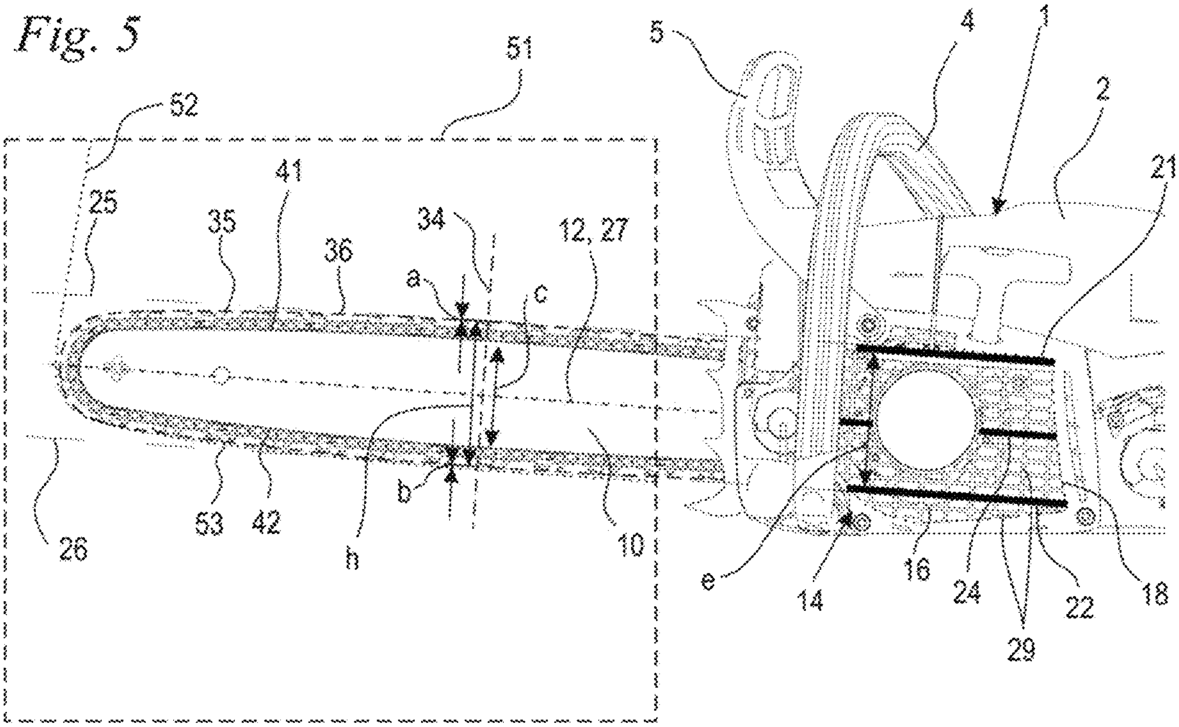
FIG. 5 and FIG. 6 show, in cut-out, side views of embodiments of chain saws.

FIG. 5 shows a further embodiment of a chain saw 1. The position of the imaginary straight lines 25 and 26 is plotted in FIG. 5. In the case of the direction of view in the transverse direction y, the saw chain area 35 is delimited by a peripheral line 36. The guide bar 10 has a width c which is measured perpendicular to the longitudinal center axis 12 and parallel to the plane 37 of the guide bar 10. The guide bar 10 is formed in particular to be slightly arched on its top side 41 and on its bottom side 42. The guide bar 10 has a point at which the width c is at its highest. This point is characterized in FIG. 5 by a dashed line 34 running perpendicular to the longitudinal center axis 12. On the line 34, the imaginary first straight line 25 adjacent to the top side 41 of the guide bar 10 has a minimum distance a to the peripheral line 36. The minimum distance a is in particular approximately zero. The distance a is less than 2 cm, in particular less than 1 cm, very particularly less than 0.5 cm. The minimum distance a is the smallest distance which the imaginary first straight line 25 has on the top side 41 to the peripheral line 36. In an alternative embodiment, it can be provided that the minimum distance a is not measured at the widest point of the guide bar 10.

Adjacent to the bottom side 42 of the guide bar 10, the imaginary second straight line 26 has a minimum distance b to the peripheral line 36. The minimum distance b is in particular approximately zero. The minimum distance b is in particular less than 2 cm, in particular less than 1 cm, very particularly less than 0.5 cm. The minimum distance b is the smallest distance which the imaginary second straight line 26 has on the bottom side 42 to the peripheral line 36. In an alternative embodiment, it can be provided that the minimum distance b is not measured at the widest point of the guide bar 10.

The distance e between the markings 21 and 22 is plotted in FIG. 5. The markings 21 and 22 can run parallel to one another in the direction of view in the transverse direction y. The markings 21 and 22 can run inclined to one another in the direction of view in the transverse direction y. In particular, in the direction of view in the transverse direction y, the imaginary straight lines 25 and 26 do not intersect on the housing 2 of the chain saw 1.

The saw chain area 35 has a height h. The height h is the largest height of the saw chain area 35 in the direction perpendicular to the longitudinal center axis 12 of the guide bar 10. The distance e corresponds in particular at least to the height h.

As FIG. 5 shows, the housing 2 bears a further marking 24 in the embodiment between the first marking 21 and the second marking 22. An imaginary further straight line 27 which runs along the further marking 24 coincides in particular with the longitudinal center axis 12. The further marking 24 indicates the position of the center of a piercing cut made with the chain saw 1. The imaginary further straight line 27 has in particular a distance of less than 10 mm to the longitudinal center axis 12 in the direction of view shown in FIG. 5 parallel to the transverse direction y. In particular, the elongation 27 of the marking 24 is inclined by an angle of less than 5° to the longitudinal center axis 12. The imaginary further straight line 27 runs in an elongation of the marking 24 in particular in the case of the direction of view in the transverse direction y.

FIG. 5 also shows in detail the configuration of the grid 16 on the second longitudinal side 14 of the chain saw 1. The grid 16 is formed by grid struts 29 which cross one another. In FIG. 5, the intake region 18 is framed with a dashed line. As FIG. 5 shows, in this embodiment, all of the markings 21, 22 and 24 run in the intake region 18. The markings 21, 22 and 24 run in particular on grid struts 29 of the grid 16.

The position of the guide bar 10 and the saw chain 11 in a work piece 51 is represented schematically in FIG. 5. The guide bar 10 and the saw chain 11 are arranged in a cut 52 made by the saw chain 11. The cut 52 has a base 53 which corresponds to the desired depth of the cut 52. The cut 52 was made with the region of the saw chain 11 arranged on the bottom side 42 of the guide bar 10. In this region, the saw chain 11 moves toward the housing 2 during operation, as FIG. 1 shows.

In order to make the cut 52, the guide bar 10 is moved with the driven saw chain 11 into the work piece 51 until the second imaginary straight line 26 reaches the desired position of the base 53 of the cut 52. Thereafter, the guide bar 10 can be guided with the saw chain 11 out of the cut 52. In order to make a cut with the region of the saw chain 11 which runs on the top side 41 of the guide bar 10 during operation, the guide bar 10 is moved with the saw chain 11 into the work piece 51 until the first imaginary straight line 25 reaches the desired position of a base of the cut. The guide bar 10 can subsequently be moved with the saw chain 11 out of the cut.

Figure 6:
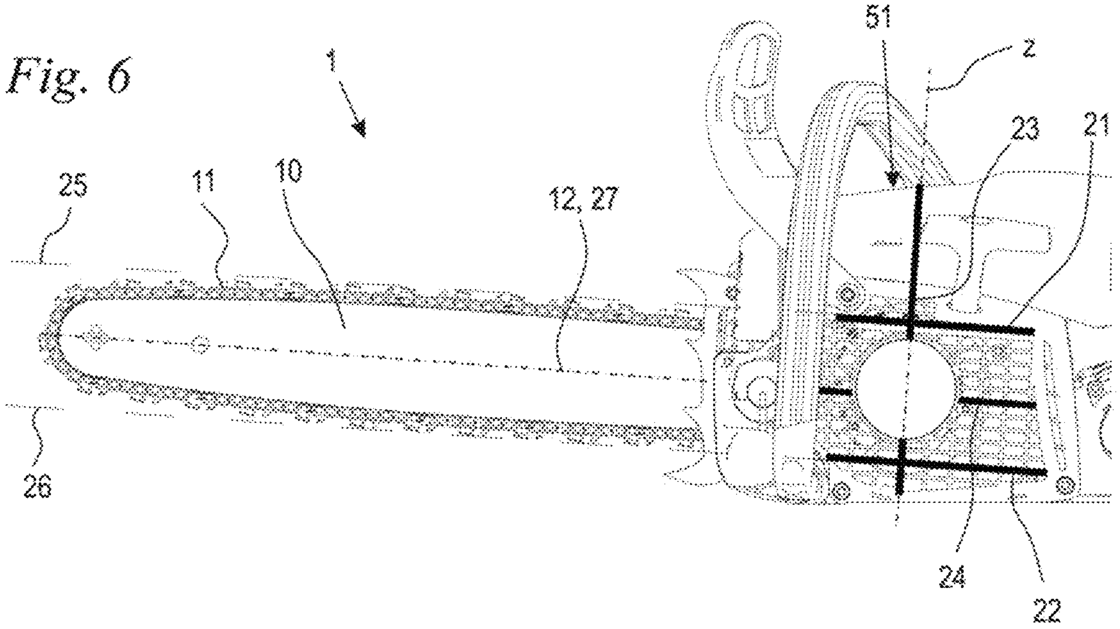

FIG. 6 shows an embodiment of a chain saw 1 which additionally bears a marking 23. The marking 23 corresponds to the drop line. In the embodiment, the marking 23 runs perpendicular to the longitudinal center axis 12 of the guide bar. In the embodiment, the marking 23 lies parallel to the vertical direction z. The marking 23 preferably has an angle of less than 5°, in particular of less than 2°, in particular of less than 1° to the vertical direction z. The marking 23 indicates the direction in which the tree trunk 28 falls when executing a drop cut 47 (FIG. 3). In the embodiment according to FIG. 6, the marking 23 also extends on a top side 41 of the chain saw 1 facing away from the rest surface 19 (FIG. 1).

Figure 7:
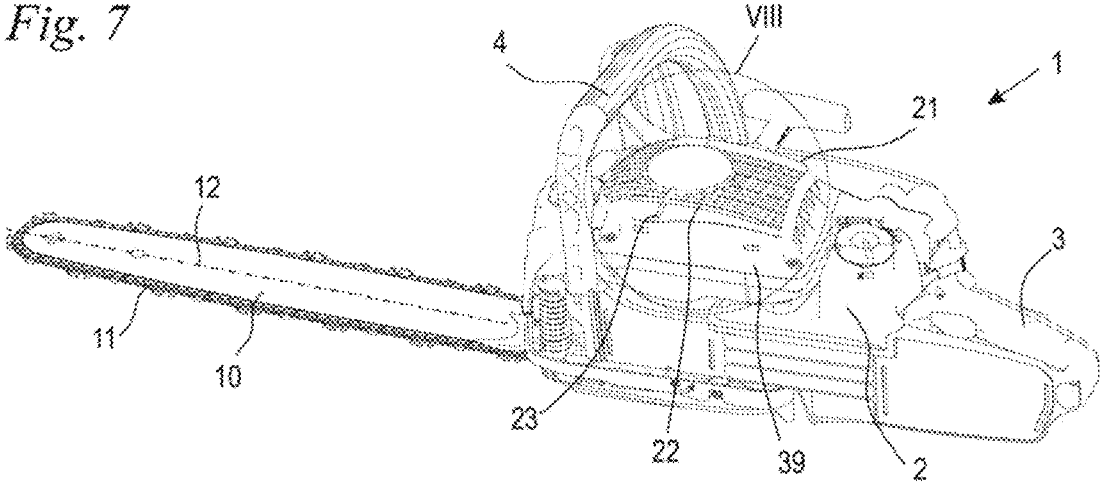
FIG. 7 shows a perspective representation of a further embodiment of a chain saw.

FIG. 7 shows an embodiment of a chain saw 1 which bears a first marking 21, a second marking 22 as well as a third marking 23. The third marking 23 runs perpendicular to the markings 21 and 22.

Figure 8:
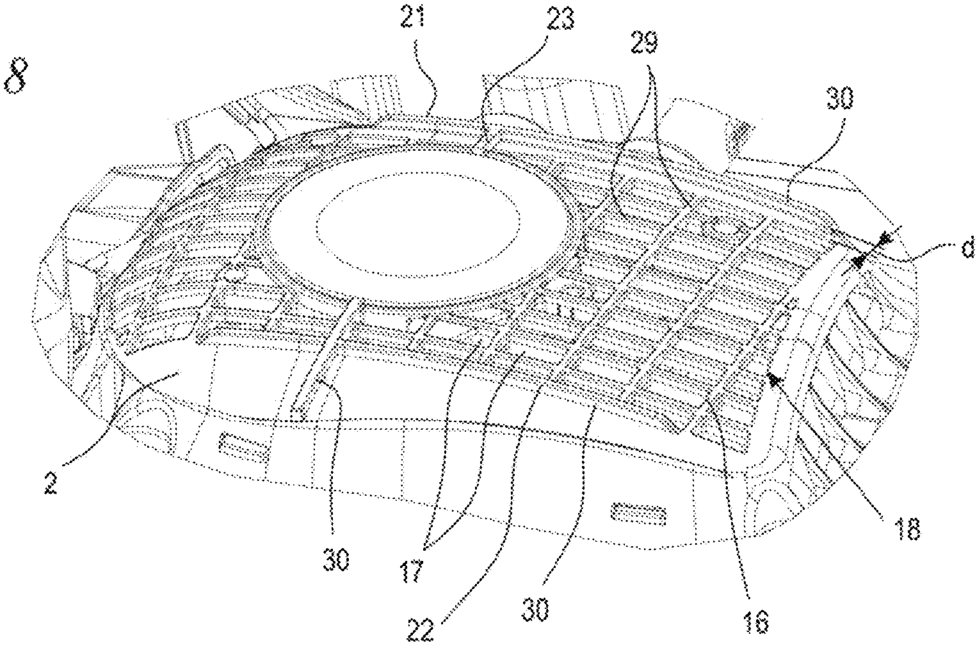
FIG. 8 shows an enlarged representation of the cut-out VIII from FIG. 7.

As FIG. 8 shows, the markings 21, 22 and 23 are formed at least partially by ribs 30. The markings 21, 22 and 23 are configured at least partially as elevations of the housing 2. In particular, the ribs 30 are formed at least partially, in particular entirely by elevations. The first marking 21 is formed at least partially by a rib 30 which runs at a distance d to the intake region 18. The second marking 22 is delimited at least partially by a rib 30 which delimits the intake region 18. The marking 23 is formed at least partially by a rib 30 which runs through the intake region 18 and partially outside the intake region 18. In the embodiment, the ribs 30 are formed in one part with a housing part of the housing 2.

Figure 9:
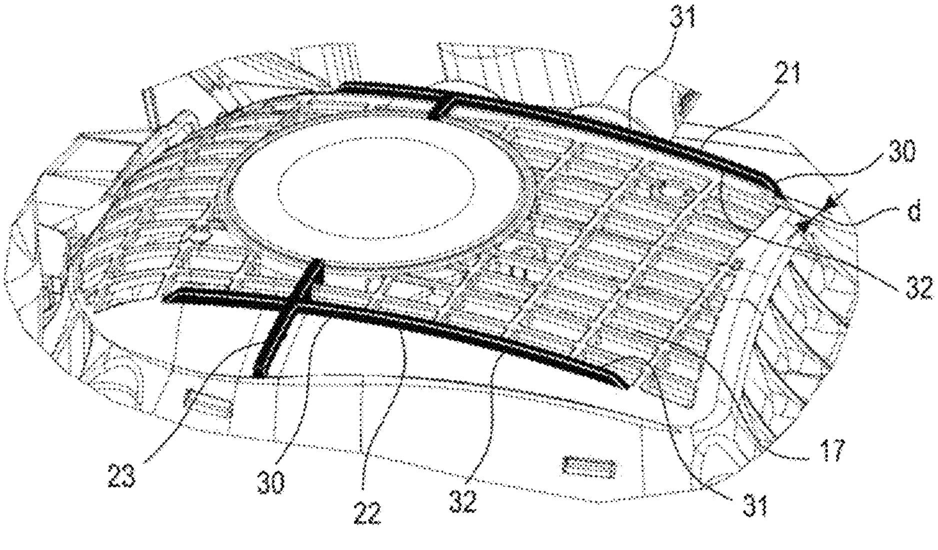
FIG. 9 shows a representation corresponding to FIG. 8 for one embodiment variant of the chain saw from FIG. 7.

FIG. 9 shows an embodiment in the case of which the markings 21, 22 and 23 represented in FIG. 8 which are formed on ribs 30 are additionally highlighted in color. The colored configuration of the markings 21, 22 and 23 is selected so that there is a significant color contrast between the markings 21, 22, 23 and the surrounding region of the housing 2. The ribs 30 have in particular in each case an end face 31 as well as opposite longitudinal sides 32. In the embodiment, both the end faces 31 and the longitudinal sides 32 of the ribs 30 are highlighted in color. As a result of this, the ribs 30 are also clearly visible in the case of inexpedient light conditions. In an alternative configuration, it can be provided that only the end face 31 and/or only one of the longitudinal sides 32 are marked in color.

Figure 10:
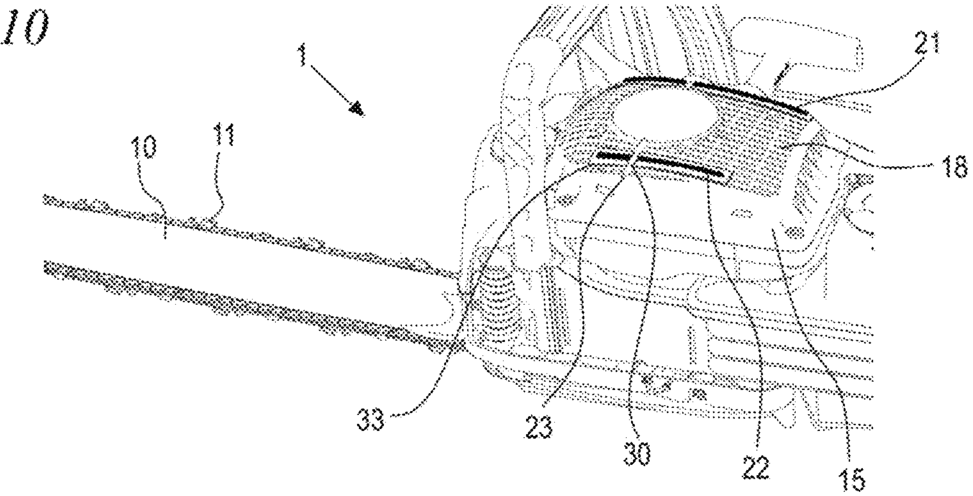
FIG. 10 shows, in cut-out, a perspective representation of a further embodiment of a chain saw.
Figure 11:
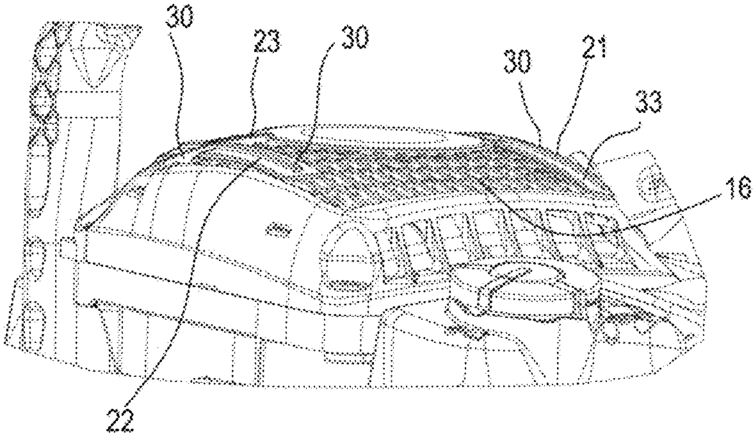
FIG. 11 shows, in cut-out, an enlarged perspective representation of the chain saw from FIG. 10.
Figure 12:
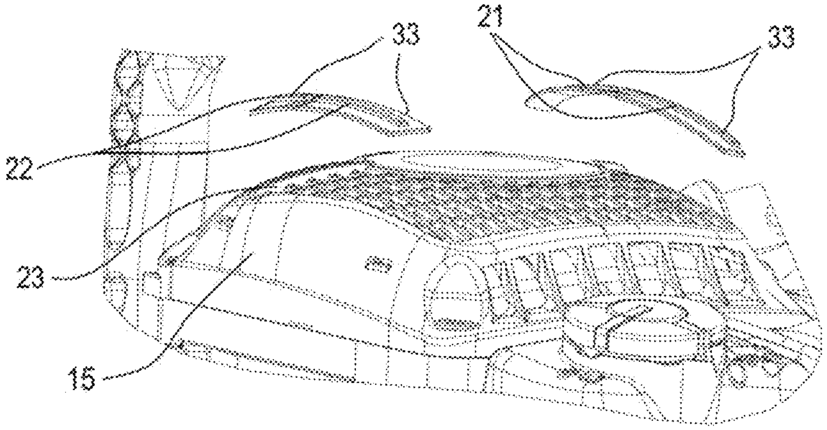
FIG. 12 shows an exploded representation of the region represented in FIG. 11 of the chain saw from FIG. 10.

FIGS. 10 to 12 show an embodiment variant in the case of which the markings 21 and 22 are applied to marking parts 33 which are fixed separately on the housing 2, in the embodiment on the housing cover 15. The marking 23 is formed in particular at least partially by a protruding rib 30 of the housing cover 15. The marking 23 is formed in particular in one piece with the housing 2.

As the exploded representation in FIG. 12 shows, the marking parts 33 are formed separately from the housing cover 15. In each case two marking parts 33 form the marking 21 and two further marking parts 33 form the marking 22. The two marking parts 33 of a marking 21 or 22 run in each case on opposite sides of the marking 23, as FIG. 10 also shows. In an alternative embodiment, it is in particular provided that at least one marking 21, 22, 23, in particular each marking 21, 22, 23 is formed by a single marking part.

Figure 13:
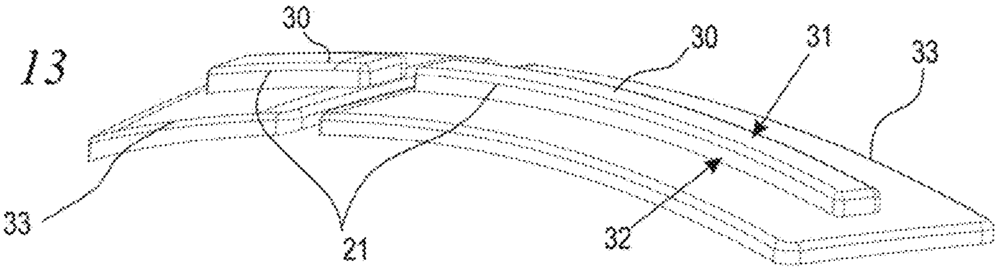
FIG. 13 shows a marking part of the chain saw from FIGS. 10 to 12 in an enlarged perspective representation; and, FIG. 14 shows a further embodiment of a chain saw.

As FIG. 13 shows, each marking part 33 bears a rib 30 which forms the marking 21 or 22. The ribs 30 have an end face 31 which points outward as well as longitudinal sides 32. The end face 31 and the longitudinal sides 32 can be highlighted in color.

The marking parts 33 can be fixed to the housing 2, for example, via a snap connection, an adhesive connection, a screw connection, magnetically or via other detachable or non-detachable types of fastening.

Figure 14:
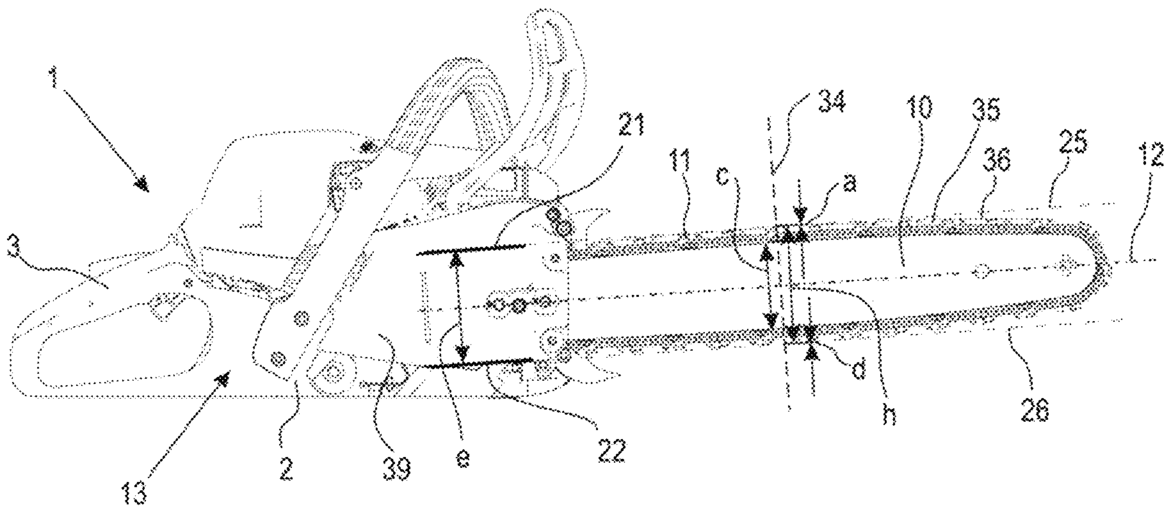

FIG. 14 shows a further embodiment of a chain saw 1. The representation shows a view of the first longitudinal side 13 of the chain saw 1. The chain saw 1 has on the first longitudinal side 13 a first marking 21 and a second marking 22. In the embodiment, the markings 21 and 22 are arranged on the sprocket wheel cover 39 of the chain saw 1. Alternatively, the markings 21 and/or 22 can be arranged on the housing 2 of the chain saw 1.

The imaginary first straight line 25, which runs along the first marking 21, and the imaginary second straight line 26, which runs along the second marking 22, are plotted in FIG. 14. The distances a and d, the width c as well as well as a portion of the peripheral line 36 of the saw chain area 35 are likewise plotted in FIG. 14.

The position of the markings 21 and 22 corresponds in terms of the distance e of the markings to one another and in terms of the position of the markings 21 and 22 in the direction of view in the transverse direction of the chain saw 1 to the position in the preceding embodiments, to the description of which reference is made.

The chain saw 1 can have further markings 23, 24 corresponding to the preceding embodiments. It can alternatively be provided that the chain saw 1 has only one marking 21 or 22.

In the embodiment according to FIG. 14, the markings 21 and 22 are formed as lines highlighted in color in comparison with the material of the sprocket wheel cover 39 or the housing 2. Alternatively or additionally, the markings 21 and 22 can be formed to correspond to the markings 21, 22, 23, 24 of the preceding embodiments, for example, as protruding ribs.

The chain saw 1 can have the markings 21 and 22 in addition to one or more markings 21, 22, 23 and/or 24 on the second longitudinal side 14. It can also be provided that the chain saw 1 has one or more markings 21, 22, 23, 24 only on the first longitudinal side 13.

In all the embodiments, the chain saw 1 is guided and carried by hand by the operator during operation. The chain saw 1 does not have a rest surface which could form a reference plane for the operator. By way of the markings 21 and 22, an operator can easily estimate the position of the cut notch made with the chain saw 1. If the marking is formed on a protruding rib 30, stability is further increased, in particular the rigidity and/or strength, of the housing 2 in the region of the rib 3.

Identical reference signs characterize elements which correspond to one another in all the embodiments. Further embodiments will arise through any desired combination of the represented configuration and positions of the markings of the embodiments.

It is understood that the foregoing description is that of the preferred embodiments of the invention and that various changes and modifications may be made thereto without departing from the spirit and scope of the invention as defined in the appended claims.

The invention claimed is:

1. A chain saw comprising:

a housing;

a guide bar configured to have a saw chain guided thereon;

a drive motor configured to drive said saw chain circumferentially during operation;

said chain saw defining a transverse direction which runs perpendicular to a plane of said guide bar;

said housing having a first longitudinal side and a second longitudinal side opposite said first longitudinal side;

said first longitudinal side and said second longitudinal side delimiting said housing in the transverse direction;

said saw chain spanning a saw chain area when revolving around said guide bar;

said saw chain area being delimited by an imaginary peripheral line in a direction of view in the transverse direction of the chain saw;

at least one marking on said second longitudinal side; and, said at least one marking being positioned on said housing such that said imaginary peripheral line, in the direction of view in the transverse direction of said second longitudinal side, has a minimum distance of no more than 2 cm or no distance to an imaginary straight line which runs along said at least one marking.

2. The chain saw of claim 1, wherein said at least one marking is positioned on said housing such that said imaginary peripheral line, in the direction of view in the transverse direction of the second longitudinal side, has said minimum distance to an imaginary straight line which runs along said at least one marking or no distance to a region of said imaginary peripheral line on which the saw chain moves in said saw chain area in a direction of said housing.

3. The chain saw of claim 1, wherein said at least one marking includes a first marking and a second marking; and, said first marking and said second marking are positioned on said housing such that said imaginary peripheral line, in the direction of view in the transverse direction of said second longitudinal side, has a first minimum distance of no more than 2 cm or no distance to an imaginary first straight line which runs along said first marking and has a second minimum distance of no more than 2 cm or no distance to an imaginary second straight line which runs along said second marking.

4. A chain saw comprising:

a housing;

a guide bar configured to have a saw chain guided thereon;

a drive motor configured to drive said saw chain circumferentially during operation;

the chain saw defining a transverse direction which runs perpendicular to a plane of said guide bar;

said housing having a first longitudinal side and a second longitudinal side opposite said first longitudinal side;

said first longitudinal side and said second longitudinal side delimiting said housing in the transverse direction;

said saw chain spanning a saw chain area when revolving around said guide bar, said saw chain area being delimited by an imaginary peripheral line in a direction of view in the transverse direction of the chain saw;

a first marking and a second marking on said second longitudinal side; and, said first marking and said second marking being positioned on the housing such that said first marking and said second marking define a mutual distance of at least 40 millimeters at all points.

5. The chain saw of claim 4, wherein said guide bar has a longitudinal center axis; and, at least one of said first marking and said second marking, in the direction of view in the transverse direction, encloses an angle of less than 5° with the longitudinal center axis of said guide bar.

6. The chain saw of claim 5, wherein said first marking and said second marking each enclose an angle of less than 5° in the direction of view in the transverse direction with the longitudinal center axis of said guide bar.

7. The chain saw of claim 4, wherein said first marking and said second marking enclose an angle of less than 5° in the direction of view in the transverse direction.

8. The chain saw of claim 4, wherein said guide bar runs closer on said first longitudinal side than on said second longitudinal side.

9. The chain saw of claim 4 further comprising:

a grid on said second longitudinal side;

said grid defining openings and having grid struts lying between said openings; and, said openings and said grid struts spanning an intake region.

10. The chain saw of claim 9, wherein at least one of said first marking and said second marking runs at least partially in said intake region.

11. The chain saw of claim 9, wherein at least one of said first marking and said second marking runs at least partially on a grid strut of said grid.

12. The chain saw of claim 9, wherein at least one of said first marking and said second marking runs at least partially outside said intake region.

13. The chain saw of claim 9, wherein at least one of said first marking and said second marking delimits said intake region.

14. The chain saw of claim 4, wherein at least one of said first marking and said second marking is formed by a line highlighted in color.

15. The chain saw of claim 4, wherein at least one of said first marking and said second marking is formed by a protruding rib.

16. The chain saw of claim 15, wherein an end face of said rib is highlighted in color.

17. The chain saw of claim 15, wherein at least one longitudinal side of said rib is highlighted in color.

18. The chain saw of claim 4, wherein at least one of said first marking and said second marking is formed on a marking part fixed on said housing.

19. The chain saw of claim 4 further comprising a further marking on said second longitudinal side; and, said further marking being inclined by an angle of less than 10° with respect to a vertical direction of the chain saw.

20. The chain saw of claim 4 further comprising a further marking on said second longitudinal side; and, wherein a further imaginary straight line which runs along said further marking does not have a distance of more than 10 millimeters to the longitudinal center axis of said guide bar at any point of said guide bar in the direction of view in the transverse direction.

21. A method for making a cut in a work piece with a chain saw, the chain saw having a housing, a guide bar on which a saw chain is guided, and a drive motor configured to drive the saw chain circumferentially during operation, the chain saw defining a transverse direction which runs perpendicular to a plane of the guide bar, the housing of the chain saw having a first longitudinal side and a second longitudinal side opposite the first longitudinal side, the first longitudinal side and the second longitudinal side delimiting the housing in the transverse direction, the saw chain spanning a saw chain area when revolving around the guide bar, the saw chain area being delimited by an imaginary peripheral line in a direction of view in the transverse direction of the chain saw, the chain saw having at least one marking on the second longitudinal side, the at least one marking being positioned on the housing such that the imaginary peripheral line, in the direction of view in the transverse direction to the second longitudinal side, has a minimum distance of no more than 2 centimeters or no distance to an imaginary straight line which runs along the marking, the method comprising:

moving the saw chain into the work piece until at least one imaginary line reaches a desired position of a base of a cut.

* * * * *